United States Patent [19]
Marvin et al.

[11] 3,727,133
[45] Apr. 10, 1973

[54] DETECTION OF COMMUTATION DEFECTS

[75] Inventors: James A. Marvin, Minneapolis, Minn.; Francois D. Martzloff; Bjorn Weichbrodt, both of Schenectady, N.Y.

[73] Assignee: General Electric Company, Schenectady, N.Y.

[22] Filed: Dec. 28, 1970

[21] Appl. No.: 101,771

[52] U.S. Cl. .........................324/158 MG, 318/490
[51] Int. Cl. ................................................G01r 31/02
[58] Field of Search.................324/158 R, 158 MG, 324/55, 128, 102, 28; 318/439, 490, 541, 542; 310/220, 241

[56] References Cited

UNITED STATES PATENTS

| | | | |
|---|---|---|---|
| 3,052,117 | 9/1962 | Miller et al. | 324/158 MG |
| 2,005,992 | 6/1935 | Heaton | 324/18 |
| 2,637,204 | 5/1953 | Short | 324/158 MG |
| 2,924,773 | 2/1960 | Lykke | 324/158 MG |

OTHER PUBLICATIONS

Roumainis, S. J.; The Null Point . . . ; AIEE Transactions; April 1956; pgs. 147–152.

*Primary Examiner*—Rudolph V. Rolinec
*Assistant Examiner*—Ernest F. Karlsen
*Attorney*—Paul A. Frank, John F. Ahern, Louis A. Moucha, Julius J. Zaskalicky, Frank L. Neuhauser, Oscar B. Waddell and Joseph B. Forman

[57] ABSTRACT

A signal is derived corresponding to variations in the unidirectional current flowing in the external power lines to a direct current rotating machine. A second signal is derived from the first signal having a period equal to the period of revolution of a commutator divided by the number of commutator segments. The appearance in the second signal of peaks short in duration in relation to said period indicates a defect in commutation of current in the armature winding of the direct current machine.

3 Claims, 8 Drawing Figures

INVENTORS
JAMES A. MARVIN
FRANCOIS D. MARTZLOFF
BJORN WEICHBRODT
BY Julius J. Zoshilsky
THEIR ATTORNEY Fig.4a — ONE REVOLUTION OF COMMUTATOR

DETECTION OF COMMUTATION DEFECTS

The present invention relates to method and apparatus for the detection of defects in the commutation of currents in a direct current rotating machine.

Commutation is critical in the proper operation of direct current rotating machinery. No method or instrumentation presently exists which can conveniently, rapidly and accurately determine the condition of current commutation in direct current machinery so as to ascertain whether commutation is being properly performed. The method currently most widely used for commutation adjustment and diagnosis is visual observation. This technique has several inherent limitations. Arcing or sparking may occur in a machine or part of a machine not available for observation. Also, while the human eye is a fairly sensitive detector of small sparks, considerable variation from optimum commutating conditions is possible before sparking is visually detected. Another method currently used is by measurement of the radio frequency noise generated by sparking at the brushes of the machine. The noise is filtered, rectified and used as a measure of commutation conditions. This method has several chief disadvantages. One disadvantage is that direct electrical connections have to be made to the machine under test. Another disadvantage is that the detection circuits are sensitive to stray noise and thus cannot be used in a noisy electrical environments. A further disadvantage is that the results obtained will vary with speed and load conditions of the machine as well as with defective commutation.

The present invention is directed to the provision of method and apparatus which overcomes many of the disadvantages of such prior art techniques as outlined above.

Accordingly, an object of the present invention is to provide means for processing signals derived from external current flowing to a direct current rotating machine to provide information about the existence of defects in the commutation of currents therein due both to defects in the elements of the machine and to defects in the adjustment of the elements of the machine.

Another object of the present invention is to provide a sensitive means for ascertaining the condition of commutation in a direct current rotating machine.

Another object of the present invention is to provide means which can rapidly and precisely determine the presence of commutation defects in direct current rotating machinery.

In carrying out the present invention as applied to the detection of defects in the commutation of current in the armature winding of a direct current rotating machine, there is provided a first means for deriving a first signal corresponding to the variations in the unidirectional current flowing through the machine and a second means for deriving from the first signal a second signal having a period equal to the period of revolution of the commutator divided by the number of commutator segments. Detection means are also provided for detecting in the second signal a peak of a duration short in relation to said first signal corresponding to a defect in commutation of current in the armature winding of the machine.

The novel features which are believed to be characteristic of the present invention are set forth in the appended claims. The invention itself, together with further objects and advantages thereof may best be understood by reference to the following description taken in connection with the accompanying drawings wherein:

FIGS. 4a, 4b and 4c show graphs of idealized electrical signals useful in explaining the operation of the invention.

Figure 5A:
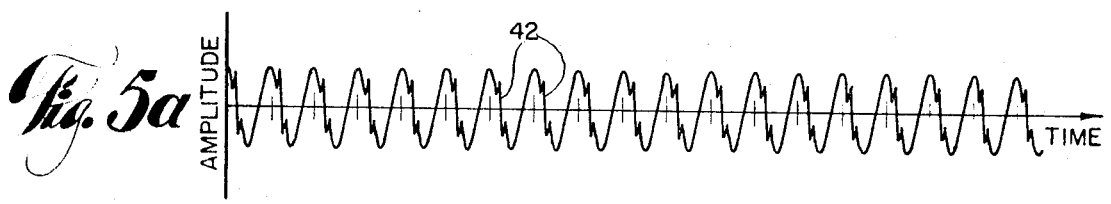
Figure 5B:
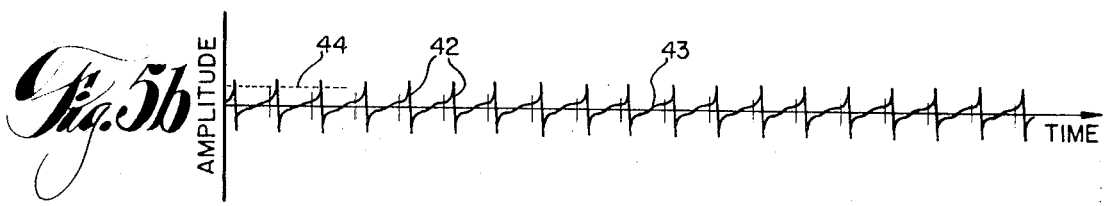

FIGS. 5a and 5b also show graphs of idealized electrical signals useful in explaining further aspects of the invention.

Figure 1:
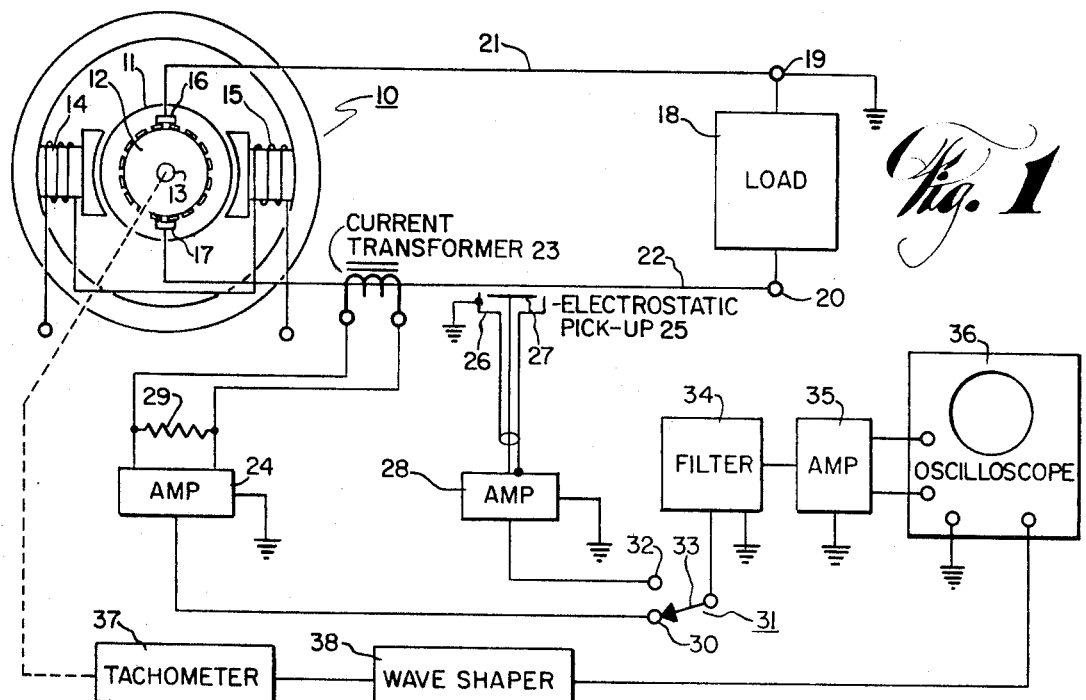
FIG. 1 shows a schematic diagram in section of a direct current rotating machine, and also shows partly in block form, apparatus in accordance with the present invention.

Referring now to FIG. 1, there is shown a direct current rotating machine 10 including an armature 11 and a commutator 12 having 16 commutator segments mounted on a shaft 13. Also provided are a pair of field windings 14 and 15 connected in series to provide a magnetic field in the machine. A pair of brushes 16 and 17 is provided contacting the commutator. The machine is shown as a direct current generator connected to supply a load 18 having a pair of terminals 19 and 20 which may be a motor or any other suitable utilization device. Terminal 19 is shown grounded for reasons which will be set forth below. Line conductor 21 connects brush 16 to terminal 19 and another line conductor 22 connects brush 17 to terminal 20.

Coupled to conductor 22 for test or diagnostic purposes is a current transformer 23 which couples with the magnetic field produced by the current flowing in the conductor 22. The current transformer 23 is in the form of a coil which readily slips over the conductor 22 and provides from the output terminals thereof, when shunted by a load such as resistor 29, a voltage signal corresponding to the variation in current flowing in the conductor. The current transformer 23 differs from conventional current transformers in that an air gap is incorporated in the magnetic circuit thereof which permits large direct current or low frequency alternating currents to flow in the conductor 22 as well as high frequency currents without causing errors in current transformation due to incremental changes in permeability or saturation of the core material. The current transformer also has the characteristic of attenuating low frequency signals as voltages developed across the output terminals varying directly with frequency. The current transformer 23 may be a device such as made by Stoddard Aircraft Radio Company of Hollywood, California and referred to as current probe Catalog 91550–1. The output of the current transformer properly loaded, for example, by a 50 ohms resistive impedance, is applied to preamplifier 24 which amplifies the signal. The output of the preamplifier is applied to one contact 30 of a single pole-double throw switch 31.

Also shown coupled to the current conductor for test or diagnostic purposes is an alternate form of sensing device in the form of an electrostatic device 25 essentially in the form of a parallel plate capacitor. One plate 26 of the device 25 is connected to ground and provides some shielding for the active plate 27. The plate or probe 27 is located in proximity to the ungrounded armature line conductor 22 of the machine in order to sense variations in the electric field due to current variations on the conductor. If the probe 27 were located adjacent the grounded conductor, such variation would not be sensed. The electrical signal at the output terminals of device 25 is amplified by preamplifier 28 and applied to the other contact 32 of the switch 31. The single pole 33 of the switch is connected to the input of filter 34 which filters out the low frequency components of the signal and allows the higher frequency component to pass as will be explained below. The output of the filter is applied to an amplifier 35, the output of which is applied to the signal or vertical deflection plates of the oscilloscope 36 to deflect the cathode ray beam thereof along the vertical coordinate thereof.

A tachometer 37 is also provided coupled to the shaft 13 of the machine to derive a signal corresponding to the rotation rate of the shaft. The tachometer signal is shaped by wave shaper 38 and utilized for synchronizing the time base or horizontal deflection plates of the oscilloscope 36.

Figure 4B:
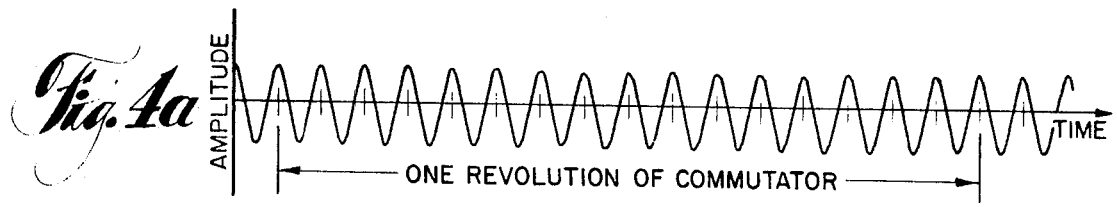
Figure 4B:
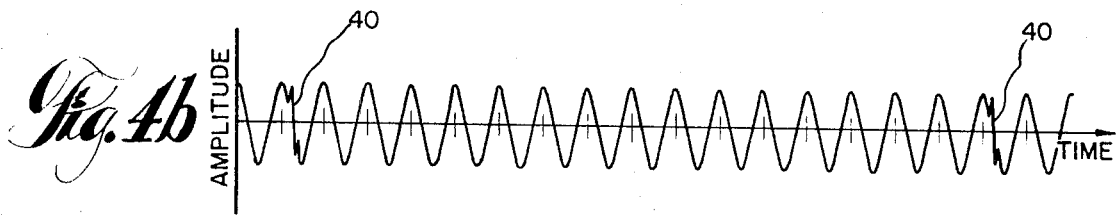

The manner in which the apparatus of FIG. 1 is utilized for the detection of commutation defects in the direct current rotating machine in accordance with the present invention will now be explained in connection with the graphs of FIGS. 4a, 4b and 4c in which signal amplitude is represented along the ordinates and time is represented along the abscissas. With energization applied to the field of the machine 10 and the armature shaft rotated by a prime mover (not shown), the machine will develop a voltage across the brushes 16 and 17 which in turn will drive current through the load 18. The current flowing in the conductors 21 and 22 is essentially unidirectional current which will have small amplitude variations. Included in these variations are components having a period corresponding to the duration of contact of a segment of the commutator with a brush, or expressed in other words for the particular machine shown, the current variations will have a period equal to the period of a single revolution of the armature divided by the number of commutator segments. The current transformer with the resistive load 29 connected across the output terminals thereof will transform such current variations occurring in the conductor 22 into a voltage signal which is amplified by the amplifier 24 and appears at the output terminal thereof. FIG. 4a shows the waveform of the voltage appearing at the output of the amplifier due to the commutation of the currents in the armature windings. In this graph are shown 16 cycles corresponding to a revolution of the commutator 12, each cycle of the waveform corresponding to a respective cycle of passage of a commutator segment under a brush. The waveform of FIG. 4a represents normal commutation without any defect, that is, when the commutation in the machine is being properly performed. FIG. 4b shows the waveform at the output of amplifier 24 as it would appear with a defect, for example, such as flat commutator segment, a burr on a commutator segment, or a partial shorting of one commutator segment to another or to ground. The waveform of FIG. 4b is identical to the waveform of FIG. 4a except that in the particular cycle corresponding to the particular commutator segment which is flat appears a peak 40, which may be a damped cyclical variation which is short in duration with respect to the cycle. The signal of the waveform of FIG. 4b applied to the high pass filter 34 appears as a signal of the waveform of FIG. 4c. The commutator segment cycle component 41 of the signal is substantially attenuated by the high pass filter 34. The signal from the filter is amplified by amplifier 35 and applied to the vertical deflection plates of the oscilloscope. The time base coordinate or horizontal plates of the oscilloscope are synchronized with the revolution rate of the commutator from the tachometer and wave shaper. Accordingly, the signal of FIG. 4c would appear displayed on the oscilloscope. With the switch 31 connected to apply signal from the output of the electrostatic pick up device 25, a similar waveform would appear.

Reference is now made to FIGS. 5a and 5b which show the commutation waveform of the generator of FIG. 1 when the elements thereof are improperly adjusted, for example, when the axes of the brushes are either advanced or retarded from their optimal position and produce defective commutation or incorrect commutation electromotive force is used along the brush axes in the case of machines with interpoles. FIG. 5a represents the signal appearing at the output of the amplifier 24 and FIG. 5b represents the signal at the output of the filter 34. Improper commutation occurs during each segment cycle and accordingly short cyclical peaks 42 due to improper commutation appear in each cycle of the commutation waveform. In FIG. 5b the filter 34 has substantially attenuated the amplitude of segment cycle component 43.

Figure 2:
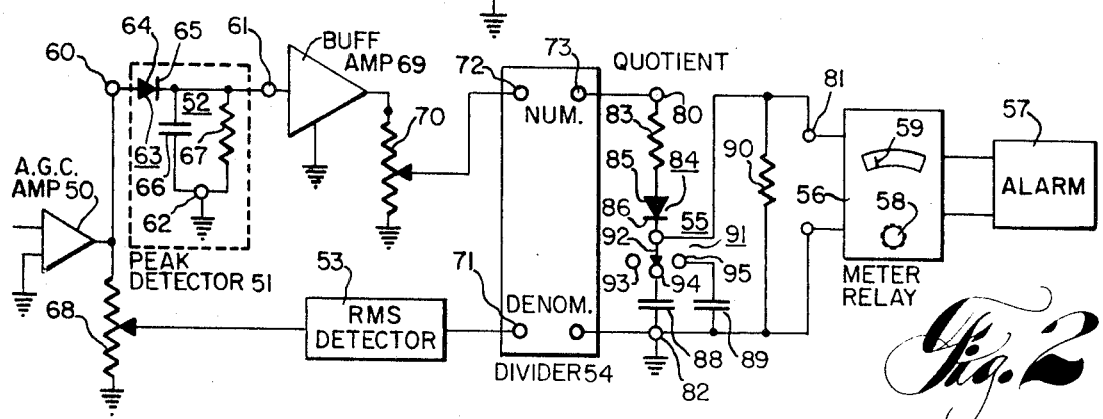
FIG. 2 shows a diagram, partly in block form, also useful in conjunction with the apparatus of FIG. 1 in accordance with the present invention.

To provide an automatic indication of condition of commutation, i.e., whether defects in the elements of the machine are within a prescribed limit, the apparatus of FIG. 2 is provided and may be used in conjunction with the apparatus of FIG. 1. The apparatus of FIG. 2 includes an automatic gain control amplifier 50 for amplifying the signal from the filter 34. Also included are a peak detection circuit 51 including a time constant network 52 for detecting peak values of signal, a root means square detection circuit 53 for obtaining the root mean square value of signal from the a.g.c. amplifier 50, a divider circuit 54 for obtaining the ratio of the peak amplitude to the root mean square value of signal, a long time constant circuit 55 for minimizing the effect of singular transient noise, and a meter relay device 56 which is responsive to a predetermined level of signal for actuation of a suitable indication means such as an alarm 57.

The gain of the amplifier 50 preferably is controlled by the peaks of the electrical signal to maintain a predetermined level of output and to avoid clipping of large peaks in the electrical signal. If desired, the gain of the amplifier may be controlled in response to a mean value of the rectified electrical signal. The output of the amplifier 50 is supplied to the peak detection circuit 51 and to the root means square detection circuit 53.

The peak detection circuit includes an input terminal 60, an output terminal 61 and a common input-output terminal 62. The peak detection circuit also includes unilaterally conducting device or rectifier 63 having an anode 64 and a cathode 65. The anode 64 is connected to the input terminal 63, the cathode 65 is connected to the output terminal 61 and common terminal 62 is connected to ground. A capacitor 66 and a resistor 67 forming time constant network 52 are connected in parallel between the output terminals 61 and 62. The signal from the amplifier 50 is applied to the input terminals 60 and 62 of the peak detection circuit 51, is rectified, and peak voltage appears across the output terminals thereof. The peak voltage appearing across the terminals 61 and 62 decays in amplitude in accordance with the time constant of the network 52. The time constant of the network 52 is selected so as to substantially retain the voltage developed thereacross during the interval between peaks in the electrical signal produced by defective commutation.

The output from the amplifier 50 is also applied through a potentiometer 68 to a circuit 53 for determining a mean value of the electrical signal. In the embodiment shown the detector circuit 53 is shown as a root mean square detector. The root mean square detector develops an output which is the root mean square value of the alternating signal applied to the input thereof and represents the average energy content of the signal. The root mean square detector may be a detector such as Series 742/9742 made by Transmagnetics of Flushing, New York. Other circuits for deriving a mean value of a signal of course may be utilized. The output of the root mean square detector is applied to the denominator terminal 71 of a divider 54. The output from the peak detector 51 is applied through a buffer amplifier 69 and a potentiometer 70 to the numerator terminal 72 of the divider 54. From the quotient terminal 73 of the divider 54, a signal is obtained which represents the quotient of the signals applied to the numerator and denominator terminals and represents the ratio of the peak signal to the root mean square signal obtained from the amplifier. The potentiometers 68 and 70 function to vary the sensitivity of the apparatus through adjustment of the gains of the signal channels feeding the numerator and denominator terminals of the divider 54. The divider 54 may be any of a number of dividers, for example, such as analog divider series 450 made by Transmagnetics of Flushing, New York.

The long time constant circuit 55 includes an input terminal 80, an output terminal 81 and a common input and output terminal 82. The long time constant circuit 55 also includes a series current limiting resistor 83, a unilaterally conducting device or rectifier 84 having an anode 85 and a cathode 86, a time constant network including capacitors 88 and 89 of different capacitances, resistor 90 and a switch 91 including an arm 92 and three contacts 93, 94 and 95. The anode 85 of the rectifier is connected through resistor 83 to the input terminal 80, and the cathode 86 of the rectifier is connected to the output terminal 81. The arm 92 of the switch is connected to the cathode 86 of the rectifier. The capacitor 88 is connected between the contact 94 and terminal 82 and capacitor 89 is connected between the contact 95 and terminal 82. The resistor 90 is connected between the output terminals 81 and 82. The time constant of the output circuit of the long time constant circuit 55 may be controlled by setting of the arm 92 of the switch to parallel the appropriate capacitors 88 and 89, in shunt with the resistor 90 to provide the desired time constant. The time constant of the output of the circuit is selected so that it is relatively large in relation to the period of rotation of the commutator under investigation. Accordingly, it has an averaging effect on the output of the divider 54 when the output signal from the accelerometer includes a periodic peak signal while producing an output that varies somewhat from one revolution to the next resulting from stray and random causes. The output from the long time constant circuit 55 is applied to a meter relay 56. The meter relay may be any of a variety of such devices commonly available, for example, the noncontacting meter relay made by the Instrument Department of General Electric Company located at Lynn, Massachusetts, which is responsive to a given level of input for actuation of a pair of contacts. Closure of the contacts of the relay is utilized to actuate an alarm 57 connected thereto to provide an indication that a particular level of an input has been applied to the meter relay 56. The knob 58 of the meter relay sets the pointer 59 on the face of the meter relay to a desired level. When the input signal causes a meter element of the relay to be aligned or exceed that level, the contacts of the relay are actuated without loading the input circuit of the meter relay to effect the operation of external apparatus such as the alarm. For example, such particular level may correspond to a ratio of peak to root mean square amplitude value represented by the value 44 on the graphs of FIGS. 4c and 5b. Accordingly, any peak exceeding this value or level would actuate the meter relay 56 which in turn would actuate the alarm 57 which then provides a visual or aural indication of the fact that the level has been exceeded. In the absence of any defect exceeding that level no regularly occurring peak signals would appear, although occasionally transient peaks from external sources would appear. While such peaks are detected by the peak detector 51, they are rejected by the long time constant circuit 55 and consequently do not actuate the meter relay 56. The time constant of the time constant network may be, for example, 100 times the period of rotation of the commutator under consideration. In the operation of the system, should the level of the signal from the machine change for various reasons, the ratio obtained from the divider 54 would not change as both the root means square value and the peak amplitude would change at the same time. Accordingly, the apparatus may be set to provide an alarm when peak to mean value of the signal exceeds a predetermined value and such setting would not have to be changed when the apparatus is used with different machines.

Figure 3:
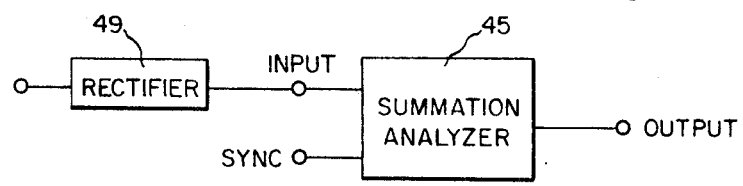
FIG. 3 is a block diagram of the apparatus useful in conjunction with apparatus of FIG. 1 in accordance with the present invention.
Figure 4C:
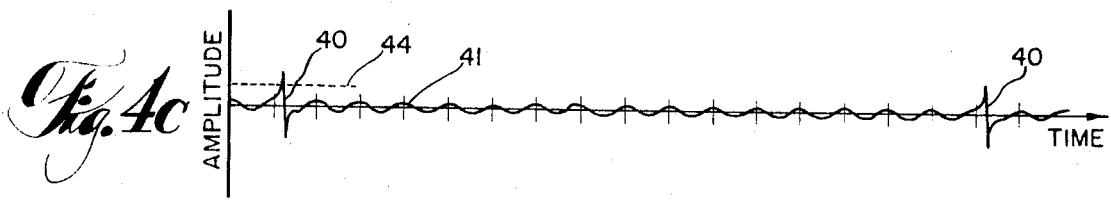

In the event that the current peaks 40 and 42 in FIGS. 4c and 5b are small in peak-to-peak amplitude in relation to the remainder of the signal and particularly when such peaks are comparable to the noise level of the signal, the apparatus of FIG. 3 may be utilized to enhance the peak signals to facilitate observation or further processing by the apparatus of FIG. 2. The apparatus of FIG. 3 includes a summation analyzer 45 having a signal input terminal, a synchronizing terminal and an output terminal. The input terminal of the summation analyzer 45 would be connected to the output of the filter and would be synchronized or triggered with the output of the wave shaper 38. The summation analyzer may be apparatus such as signal analyzer type 5480B made by Hewlett Packard Company of Santa Clara, California, which sums a plurality of signal sampling cycles, each cycle including a plurality of samples and which provides an averaged output of one cycle of the summed samples. Once initiated, the summation analyzer takes a predetermined number of samples in sequence and stores the signal level of each sample in its memory. When it is again triggered by a subsequent trigger pulse, the sampling cycle is repeated and each sample of the cycle is added to a respective sample of the preceding cycle or cycles. After a predetermined number of cycles have been executed and averaged, the summation analyzer is automatically operated in the display or readout mode in which the averaged sum of cycles of signal samples are supplied to the output terminals of the apparatus for display or further signal processing as desired. The number of samples taken per cycle can be set as desired and the duration of the cycles of samples may also be set as desired to match the cyclical phenomena under study. The output from the summation analyzer is applied to the oscilloscope 36 for display purposes or to the apparatus of FIG. 2 as explained above. A rectifier 49 may be provided at the input to the summation analyzer. The rectification of the signal to be analyzed serves to avoid signal cancellation in summation analyzers which might otherwise happen if consecutive signal elements to be summed are not exactly identically positioned in time.

While the invention has been described in specific embodiments it will be appreciated that modifications may be made by those skilled in the art and we intend by the appended claims to cover all such modifications as fall within the true spirit and scope of the invention.

What we claim as new and desire to secure by Letters Patent of the United States is:

1. Apparatus for detecting commutation defects in a direct current rotating machine having a commutator and a pair of power conductors coupled therewith for conducting unidirectional currents with a low frequency component having a period determined by a single revolution of the commutator divided by the number of commutator segments comprising sensor means for deriving a first signal corresponding to variations in said unidirectional current and including a high frequency component indicative of a commutation defect, circuit means for deriving from said first signal a second signal having said low frequency component period in which said high frequency component is enhanced, and detection means for detecting a peak in said second signal of a duration short in relation to said low frequency component period to provide an indication of a commutation defect, said detection means including means for deriving a mean value signal corresponding to the average value of a rectification of said second signal, means for deriving a peak value signal corresponding to the peak value of said second signal, and means for deriving an output signal corresponding to the ratio of the amplitudes of said peak value and mean value signals said output signal being indicative of commutation defects.

2. Apparatus for detecting commutation defects in a direct current rotating machine having a commutator and associated brushes, and a pair of external power conductors effectively connected to said brushes and conducting unidirectional currents with a low frequency component having a period determined by a single revolution of the commutator divided by the number of commutator segments comprising sensor means for removable coupling to one of said external power conductors for deriving a first signal corresponding to variations in said unidirectional current and including a high frequency component indicative of a commutation defect, circuit means including a high pass filter for deriving from said first signal a second signal having said low frequency component in which said high frequency component is enhanced, and detection means for detecting a peak in said second signal of a duration short in relation to said low frequency component period to provide an indication of a commutation defect, said detection means comprising a peak detector circuit, a mean value circuit for deriving a means value of said second signal, and a circuit for deriving an output signal corresponding to the ratio of the outputs of said peak detector and mean value circuits which output signal is an indication of commutation defects.

3. Apparatus according to claim 2 further including a long time constant circuit for averaging said output signal to thereby reject extraneous peaks in said second signal not indicative of a commutation defect.

* * * * *